United States Patent [19]

Maruyama et al.

[11] Patent Number: 5,046,115
[45] Date of Patent: Sep. 3, 1991

[54] METHOD OF PROCESSING IMAGE DATA ON CRACK

[75] Inventors: Tatsuya Maruyama; Toshihiko Fukuhara, both of Kanagawa, Japan

[73] Assignee: Kabushiki KaishaKomatsu Seisakusho, Tokyo, Japan

[21] Appl. No.: 378,522

[22] PCT Filed: Oct. 26, 1988

[86] PCT No.: PCT/JP88/01087
§ 371 Date: Jun. 22, 1989
§ 102(e) Date: Jun. 22, 1989

[87] PCT Pub. No.: WO89/04018
PCT Pub. Date: May 5, 1989

[30] Foreign Application Priority Data

Oct. 26, 1987 [JP] Japan .................... 62-270017
Nov. 6, 1987 [JP] Japan .................... 62-280776

[51] Int. Cl.$^5$ .................... G06K 9/48; G06K 9/00; H04N 7/18
[52] U.S. Cl. .................... 382/22; 382/1; 382/16; 358/106; 358/107; 356/237
[58] Field of Search .................... 382/1, 8, 16, 22; 358/107, 108, 106; 356/237

[56] References Cited

U.S. PATENT DOCUMENTS

| | | | |
|---|---|---|---|
| 4,207,593 | 6/1980 | Deutsch et al. | 358/106 |
| 4,403,294 | 9/1983 | Hamada et al. | 358/106 |
| 4,479,145 | 10/1984 | Azuma et al. | 358/107 |
| 4,484,081 | 11/1984 | Cornyn, Jr. et al. | 358/106 |
| 4,764,970 | 8/1988 | Hayashi et al. | 382/8 |
| 4,833,721 | 5/1989 | Okutomi et al. | 382/21 |
| 4,899,296 | 2/1990 | Khattak | 358/108 |
| 4,903,312 | 2/1990 | Sato | 382/21 |

Primary Examiner—Leo H. Boudreau
Assistant Examiner—Steven P. Fallon
Attorney, Agent, or Firm—Diller, Ramik & Wight

[57] ABSTRACT

The present invention is concerned with an automatic recognition of image data representative of crack derived from measurements of the road surface using a computor (4). An image memory in which data on the road surface are stored is divided into a plurality of regions and the region constituting a part of the divided regions for which a determination has been made such that crack (LP) is existent is utilized as a start point for a pursuing operation. A series of processings of pursuit and extraction such as extracting line segments (SG) corresponding to the crack (LP) from the start point region, making a determination on the direction of pursuing to be next effected on the basis of the line direction ($\theta$) of the extracted line segments (SG), making a determination as to whether or not crack (LP) is existent in the adjacent divided regions situated in the direction of pursuing and performing a processing of extracting line segments (SG) only in the region for which a determination has been made such that crack (LP) is existent are repeatedly exeuted at every start point until pursuing is terminated. This permits data representative of the crack in the image memory to be extracted in the form of a combination among the line segments (SG). Thus, extraction of line segments is not required in all the divided regions. Consequently, a processing speed can be increased.

7 Claims, 12 Drawing Sheets

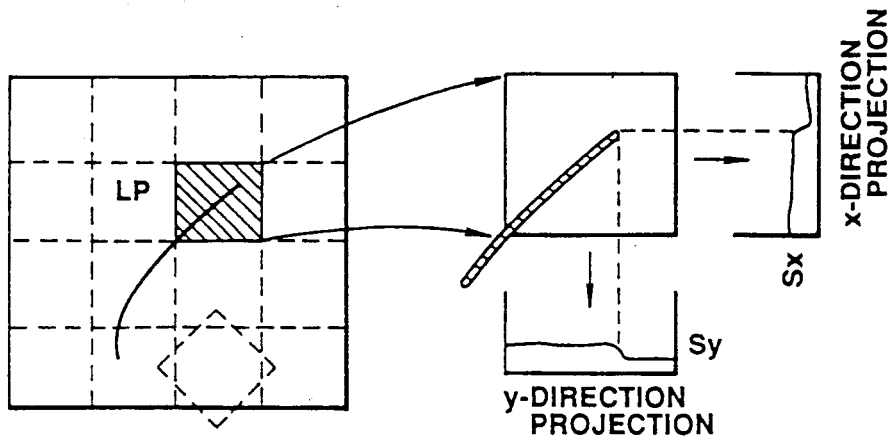
FIG. 6 (a)     FIG. 6(b)
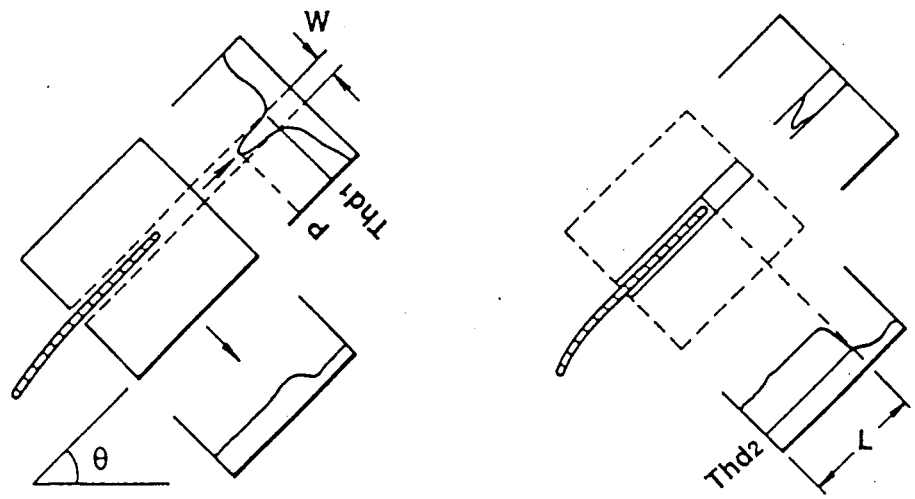
FIG. 6 (c)     FIG. 6(d)
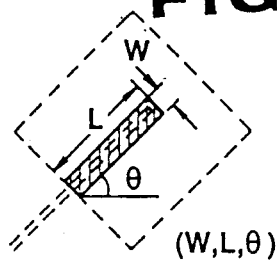
FIG. 6 (e)

$0° \leq \theta \leq 23°,$
$158° \leq \theta \leq 179°$ $24° \leq \theta \leq 68°$ $69° \leq \theta \leq 112°$ $113° \leq \theta \leq 157°$

◨ : EXTRACTING OF LINE SEGMENTS
⊡ : NO CRACK RECOGNIZED (a)          (b)

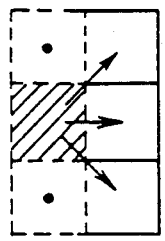 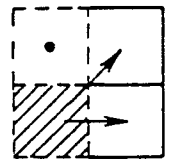 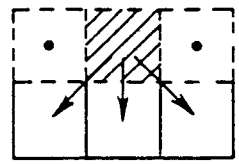
FIG.17(a)   FIG.17(b)   FIG.17(c)
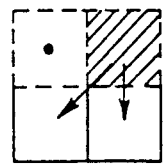 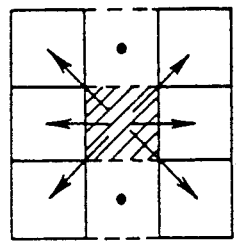 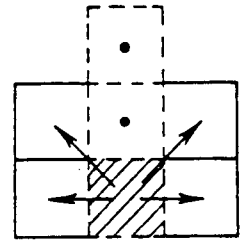
FIG.17 (d)   FIG.17(e)   FIG.17(f)
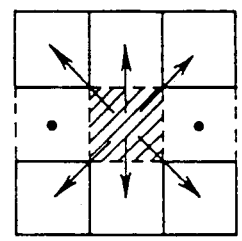 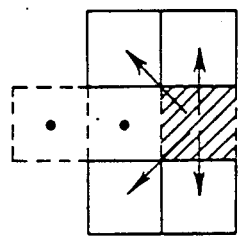
FIG.17(g)   FIG.17(h)
▨ ; START POINT FOR PURSUING OPERATION
⊡ ; REGION FOR WHICH DETERMINATION IS MADE THAT NO CRACK EXISTS
☐ ; SLIT TO BE PURSUED NEXT

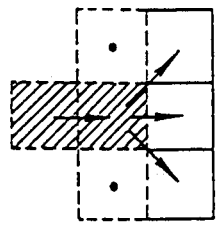 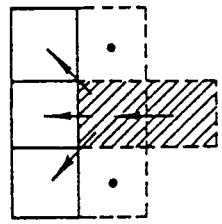
FIG.18(a)   FIG.18(b)
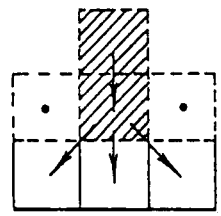 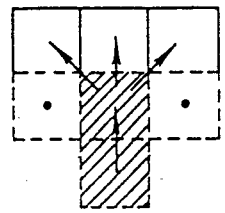
FIG.18(c)   FIG.18(d)
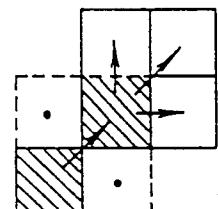 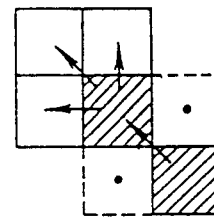
FIG.18(e)   FIG.18(f)
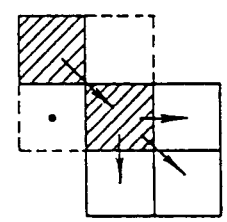 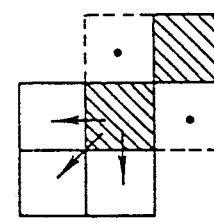
FIG.18(g)   FIG.18(h)
▨ : SLIT FOR WHICH DETERMINATION IS MADE THAT CRACK EXISTS
⊡ : SLIT FOR WHICH DETERMINATION IS MADE THAT NO CRACK EXISTS
☐ : SLIT TO BE PURSUED NEXT

METHOD OF PROCESSING IMAGE DATA ON CRACK

TECHNICAL FIELD

The present invention relates to a method of effectively performing a series of processings from recognizing of image data representative of crack derived from measurements for a road surface via extracting of line segments in correspondence to the crack till outputting of results derived from analyzing of a crack occurrence rate or the like.

BACKGROUND ART

To evaluate a degree of damage or injury of a road, the currant state of a road surface is represented using three factors, one of them being descent of the road caused by wheels, other one being ruggedness appearing in longitudinal and transverse directions and another one being crack developed thereon. To automate measurements for these factors which have been heretofore carried out by visual recognition, there have been made various proposals.

A conventional typical measuring system utilizing these automatic techniques is classified into two types, one of them being a slit camera system (as disclosed in an official gazette of Japanese Published Patent NO. 281915/1986) and the other one being a laser light receiving system (as disclosed in specifications of Japanese Patent Application NO. 229563/1983 and Japanese Patent Application NO. 233923/1984). According to the proposed conventional measuring systems, an image taking camera, a laser oscillator, a light receiver and other associated components are mounted on a vehicle and this vehicle intended to carry out measurements is caused to move on a road so as to allow image data representative of the road surface to be obtained by automatic measurements. Specifically, image data representative of the road surface derived from measurements for the latter are recorded in a data recorder such as a video tape recorder (VTR) or the like means and the recorded data are later analyzed to evaluate the road surface.

When the recorded data are analyzed, evaluation has been hitherto carried out by a conversation between an operator and a monitor display image surface. For example, in the laser system, a tape in which image data representative of the road surface is processed to indicate them on the monitor display via a reproducer. Then, a lattice-shaped mesh is placed on the display image surface so as to allow the latter to be divided into a plurality of square regions. The operator makes a visual determination as to whether crack is existent or not in the respective divided regions and results derived from the determination are noted on a recording paper in the form of a section paper using marks such as ◯, X or the like. Finally, evaluation results such as a crack occurrence rate ( =the number of meshes where crack is existent/the total number of meshes) or the like are calculated with reference to the recording paper.

As is apparent from the above description, according to the conventional systems, data representative of crack included in the image data on the road surface are analyzed by allowing an operator to make a visual determination while watching the monitor display image surface. Consequently, there arise problems that data are processed at a slow speed and an incorrect determination is made due to visual recognition.

The present invention has been made with the foregoing background in mind and its object resides in providing a method of processing image data representative of crack which assures that the image data are processed at a high speed with increased accuracy by fully automating a processing of analyzing the image data with the use of a computer.

DISCLOSURE OF THE INVENTION

According to the present invention, an image memory in which data representative of a road surface is divided into a plurality of regions, a determination is made separately for the respective divided regions as to whether or not crack is existent in a predetermined divided region constituting a part selected from the plural divided regions, the region for which a determination is made such that crack is existent is selected as a start point for a pursuing operation, line segments corresponding to the crack are extracted from the selected start point region, the direction of pursuing to be next effected is decided on the basis of the line direction of extension of the extracted line segments, a determination is made as to whether or not crack is existent in adjacent divided regions situated in the direction of pursuing, and line segments are extracted in the region for which a determination is made such that crack is existent. A series of processings of pursuing and extracting as mentioned above are repeatedly executed until pursuing is terminated at every start point.

Namely, according to the present invention, a start point for a pursuing operation is first selected by partially searching for a divided region. Then, by repeatedly executing the aforementioned processings of pursuing and extracting line segments using the selected start point as an initial point, crack included in a predetermined region is extracted in the form of a combination with line segments.

In this manner, a processing of extracting data representative of crack is fully automated in accordance with the method of the present invention. Thus, an incorrect determination is hardly made, a recognizing rate can be improved and the method can be practiced at an inexpensive cost by decreasing the number of operators. Further, since employment of a processing of pursuing makes it unnecessary to perform a processing of extracting line segments in all the regions, a speed required for processing data can be increased substantially.

Additionally, according to the present invention, a start point for a pursuing operation is selected and thereafter the following processings of pursuing using the selected start point region as an initial point (repeat of a processing of deciding the direction of pursuing, a processing of extracting line segments and a processing of making a determination as to whether crack is existent or not) are performed at every start point.

First, when a pursuing operation is started, the direction of pursuing to be next effected is decided on the basis of the position where a relevant start point region is situated and thereafter a determination is made as to whether or not crack is existent in divided regions adjacent to the start point region. When it is found that crack is existent, a processing of extracting line segments is performed in the adjacent regions. Thereafter, a processing of deciding the direction of pursuing, a processing of making a determination as to whether crack is existent or not and a processing of extracting line segments are repeatedly performed in the same manner as mentioned above, whereby crack included in a predetermined region is extracted in the form of a combination with the line segments. During such processings, the direction of pursuing is decided on the basis of a positional relationship between the divided region for which a determination is made at this time such that crack is existent and the divided region for which a determination is made at the preceding time such that crack is existent, and this processing of deciding the direction of pursuing is performed in parallel with the aforementioned processing of extracting line segments.

Namely, with such processings, the direction of pursuing to be next effected is not decided in dependence on the line direction derived from results in relation to extraction of line segments but it is decided in dependence on a positional relationship between two divided regions for which existence of crack is recognized from results on determination as to whether crack is existent or not. Consequently, according to the present invention, a processing of extracting line segments and a processing of deciding the direction of pursuing can be executed in parallel with each other. This makes it possible to remarkably shorten a time required for processing data in comparison with the method of executing all processings in series.

BRIEF DESCRIPTION OF THE DRAWINGS

FIG. 6 is an illustrative view for explaining the process in FIGS. 5a-5c in a more detailed manner.

BEST MODE FOR CARRYING OUT THE INVENTION

Now, the present invention will be described in detail hereinafter with reference to the accompanying drawings which illustrate preferred embodiments thereof.

Figure 2:
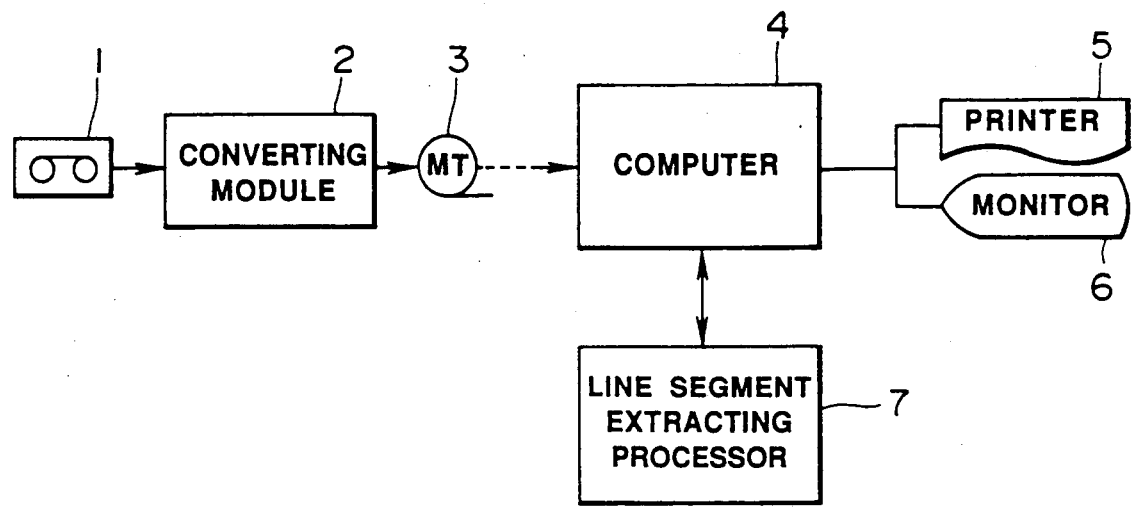
FIG. 2 is a block diagram illustrating by way of example the structure for carrying out the present invention.

FIG. 2 schematically illustrates by way of example the structure for carrying out the present invention. Referring to FIG. 2, a video tape 1 is recorded with image data representative of a road surface, wherein the data are measured on a road surface measuring vehicle employing a laser system. A converting module 2 is such that the data on an image representative of the road surface recorded in the video tape 1 are quantified, e.g., in the form of eight bits (including 256 tones) in unit represented by 1 mm×1 mm pixel and they are then written in a magnet tape 3. It should be noted that data obtained by using the laser system are expressed as a tone image adapted to be varied from white to black under the effect of a shadow in such a manner that a region having crack is represented by black (tone 0), a road surface having no crack is represented by gray and a while center line or the like is represented by white (tone 255).

A computor 4 includes an image memory in which the data representative of crack transferred from the magnetic tape 3 in frame unit are stored. It is operated to process the data in the following manner and then output to a printer 5 results derived from the foregoing processing or represent them on a monitor 6. In this case, among a series of data processings, a processing for extracting line segments (to be described later) is executed using an exclusively employable processor 7.

Next, a series of data processings in accordance with the present invention will successively be described below with reference to a flowchart in FIG. 1 which illustrate an example thereof.

First, the computor 4 transfers to an image memory incorporated therein the data representative of cracks on the road surface recorded in the magnetic tape 3 in frame unit (in the form of e.g., 512×512 pixels) (step 100). Then, the following analyzing processing is executed in frame unit for the image data which have been transferred in that way.

Specifically, the computor 4 calculates an average value $$D_i \left( = \sum_{i=1}^{n} D_i/n \right)$$

Figure 3:
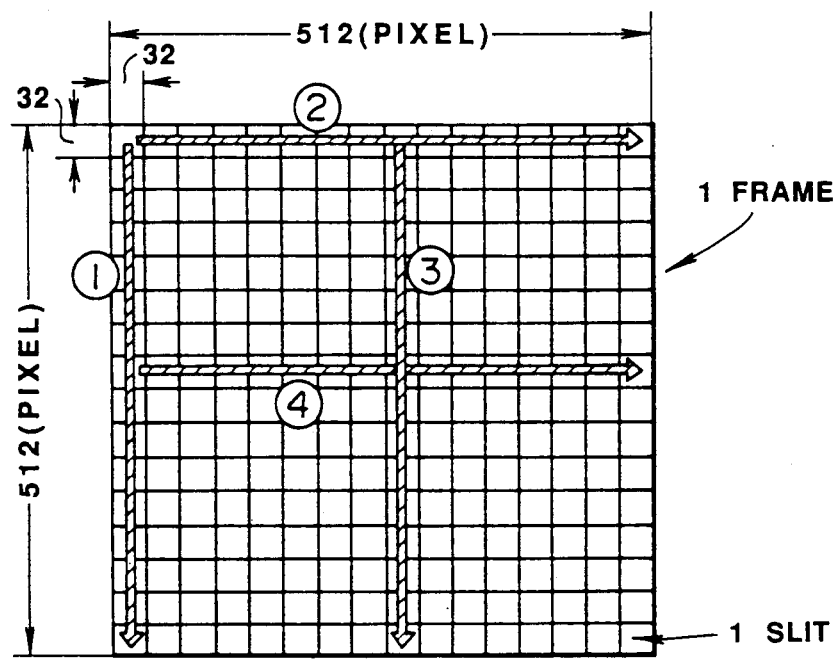
FIG. 3 is an illustrative view explaining by way of example a processing of searching for a start point.

(where $D_i$: data on density, $n = 512 \times 512$) among image data covering one frame as shown in FIG. 3 and thereafter calculates a threshold $\delta$ employable for the purpose of making a determination using the average value $D_i$ as to whether crack is existent or not, wherein the threshold $\delta$ is used for a processing of searching for a starting point for later steps 130 to 150 (step 110).

Next, the computor 4 is operated so as to allow the image data transferred thereto to cover one frame to be subjected to square slitting as numbered by 16×16 as shown in FIG. 3, whereby the image is divided into a number of 16×16 square slit regions by slitting in that way (step 120). In this case, one slit region includes image data in the form of 32×32 pixels.

With respect to such divided image data, the computor 4 first executes a processing of "searching for a start point" in relation to crack. This processing is intended to search for a start point for the purpose of executing a next processing of pursuing (to be described later). During this processing of searching for a start point, presence or absence of the crack is not recognized over all the slit regions but a determination is made in the order of (1), (2), (3) and (4) only in the slit regions situated below arrow marks (1), (2), (3) and (4) in FIG. 3 in the direction as identified by the arrow marks.

Incidentally, partial limitation of the start point searching regions in that way is based on an idea that a required start point can be detected in any one of the slit regions as long as the regions corresponding to the arrow marks (1), (2), (3) and (4) in FIG. 3 are monitored in view of the fact that crack usually has a certain extent of length.

A determination on the existence of crack will be made in the following.

Figure 4:
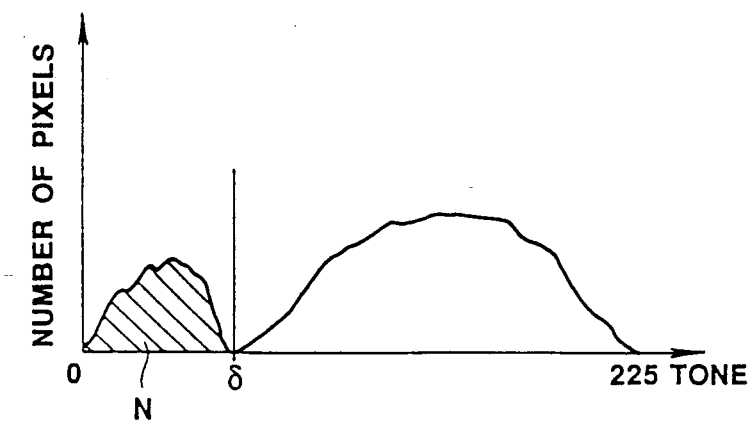
FIG. 4 is a graph for explaining a method of making a determination as to whether crack is existent or not.

Namely, the computor 4 is operated to prepare a histogram representing a relationship of the degree of tone to the number of pixels as shown in FIG. 4 in the respective regions and then calculate for the respective slit regions on the basis of the histogram the number N of pixels (corresponding to the hatched part in FIG. 4) remaining less than the threshold δ. When it is found that the number N is more than a preset number $N_a$, the computor 4 makes a determination that crack is existent, while when it is found that the number N is less than the preset number $N_a$, it makes a determination that no crack is existent (step 130).

Figure 5A:
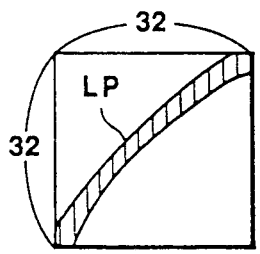
FIGS. 5a-5c are illustrative views for explaining a process of extracting line segments.

This idea is based on the reason that since crack usually extends across a slit as shown in FIG. 5(a), at least pixels more than the preset value $N_a$ (e g., 36) each having data on a density near to the tone 0 (corresponding to black) are existent when crack is existent within a slit region (represented by 32×32). For the reason, in this embodiment, the number N of pixels less than a threshold δ determined with reference to an average value or a middle value) within a relevant frame is calculated by preparing a histogram within a slit and then execute a threshold processing using the above threshold δ. Then, by comparing the number N with the preset value $N_a$, a determination is made as to whether crack is existent or not.

Figure 5B:
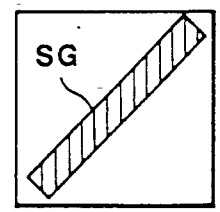
Figure 5C:
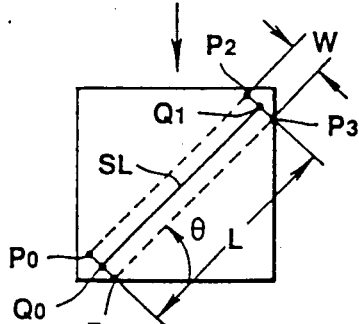

Next, the computor 4 is operated to carry out a processing of extracting line segments in respective slit regions where a determination is made by the aforementioned start point searching processing such that a start point (representative of crack) is existent (step 140). Specifically, in a case where it is found during this line segment extracting processing that a crack pattern LP as shown, e.g., in FIG. 5(a) is existent, it is extracted as a line segment pattern SG having a rectangular contour as shown in FIG. 5(b) and results derived from the extraction are then outputted as coordinates (identified by coordinates indicative of points $P_0$ to $P_3$) representing line segments having a line width W, a line length L and a line direction ω as well as coordinates (identified by coordinates indicative of points $Q_0$ and $Q_1$) representing a ridge line SL for the line segment SG.

Since the aforementioned line segment extracting processing is carried out using the technique proposed by the same applicant as that of the prior invention which was filed under Japanese Laid-Open Patent NO. 12490/1986 and of which title is designated by a method of recognizing a linear pattern, a part of the proposed method will briefly be described with reference to FIG. 6.

According to this prior method, image data are divided into a plurality of square slit regions (represented by 4×4 in this case) in the same manner as in FIG. 3 and wave shapes projected in X- and y-directions are then obtained for the respective slit regions (see FIGS. 6(a) and (b)). In this case, an average value $$\sum_{i=1}^{n} D_i / n \ (D_i:$$

data on density) among density data for a row of pixels (the number of pixels : n ) arranged in the direction of projection is used as values $S_x$ and $S_y$ indicative of projected wave shape.

Next, a slit is successively turned by a predetermined angle in the range of 0 to 90 degrees about the center of the respective slit regions so that a projected wave shape is obtained at every turning movement by the predetermined angle. As a method of obtaining a projected wave shape of the slit as the latter is turned, there are proposed two methods, one of them being such that the slit is turned while an image is kept immovable and the other one being such that an image is turned while the slit is kept immovable.

In the case where a projected shape is obtained at every turning movement at the predetermined angle in this manner, the projected wave shape as seen in the direction along a linear pattern LP assumes a maximum peak value P as shown in FIG. 6(c), when the slit region is turned by a certain predetermined angle ω. This permits the direction ω of extension of the linear pattern to be obtained.

Next, a line width W of the linear pattern is defined by a length W of the line extending tangential to the peak of a projected shape when the latter is subjected to threshold processing with a predetermined threshold $T_{hd1}$, as shown, e.g., in FIG. 6(c).

Next, the length L of the linear pattern is determined as a line length L included in the slit region by restricting the slit region to a crack width W which has been already calculated only in the direction of width thereof, obtaining a projected wave shape with respect to the restricted slit region and then allowing it to be subjected to threshold processing using a certain threshold $T_{hd2}$, as shown in FIG. 6(d). This is because of the fact that in the case of a simple square slit, the peak of a wave shape as seen in the direction along extension of the line appears clearly but the peak of the same as seen in the direction has a reduced optical contrast.

Thus, by analyzing the projected wave shape in that way, the linear pattern included in a single slit region can be recognized as a rectangular pattern of which width W, length L and direction ω are already known, as shown in FIG. 6(e). This is called a line segment. Accordingly, when such processings are carried out for respective mesh regions shown in FIG. 6(a), a line pattern of which width W, length L and direction ω are already known can be extracted as a line segment.

Namely, during the aforementioned processing of searching for a start point, a pursuing start point in the relevant frame is selected by repeating a processing of making a determination as to whether a start point is existent or not and a processing of extracting line segments in accordance with the order of the arrow marks (1), (2), (3) and (4), and line segments are extracted from the selected start point.

The computor 4 allocates a serial number to the respective slit regions which have been selected by the aforementioned processing of searching for a start point (step 160) and then it executes the following "processing of pursuing" in the order of the allocated numbers.

First, the direction of pursuing is determined on the basis of the direction ω of extension of the line segment which has been extracted in the slit region where NO. 1 start point is situated (steps 170 and 180). A determination on the direction of pursuing is made as shown, e.g., in FIG. 7.

Figure 7:
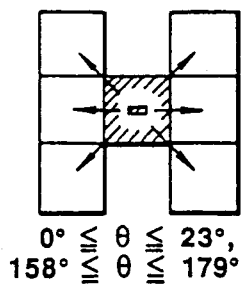
FIGS. 7a-7d are illustrative views for explaining a processing of pursuing.
Figure 7:
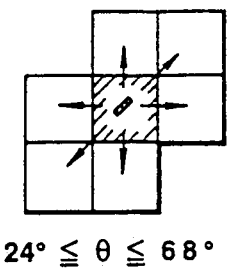
Figure 7:
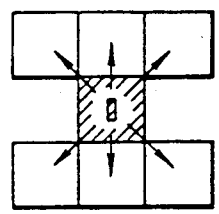
Figure 7D:
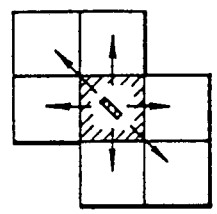

Referring to FIG. 7, it is assumed that a middle slit as represented by hatched lines is defined as a slit from which pursuing is started. As shown in FIG. 7(a), when the line direction ω is in the range of 0° $\leq \omega \leq 23$° and 158° $\leq \omega \leq 179$°, pursuing is effected toward six adjacent slits as represented by arrow marks of solid lines and dotted lines with the exception of adjacent slits located just above and beneath the middle slit. It should be noted that in a case where pursuing has been effected toward the middle slit from the three slits on the left-hand side, next pursuing is effected only toward three slits on the right-hand side as shown by arrow marks of solid lines, in a case where pursuing has been effected toward the middle slit from three slits on the right-hand side, next pursuing is effected only toward the three slits on the left-hand side as shown by arrow marks of dotted lines and in a case where pursuing has been effected toward the middle slit from the slits located just above and beneath the middle slit, next pursuing is effected toward six slits as shown by arrow marks of solid lines and dotted lines. When the line direction ω is in the range of 24° $\leq \omega \leq 68$°, next pursuing is effected toward six slit regions with the exception of the right-lower and left-upper slit regions, as shown in FIG. 7(b). Alternatively, next pursuing is effected toward either of three slit regions represented by arrow marks of solid lines and three slit regions represented by arrow marks of dotted lines. Similarly, when the line direction ω is in the range of 69° $\leq \omega \leq 112$°, next pursuing is effected toward six slit region with the exception of the right and left slit regions, as shown in FIG. 7(c). Alternatively, next pursuing is effected toward either of three slit regions represented by arrow marks of solid lines and three slit regions represented by arrow marks of dotted lines. Further, when the line direction ω is in the region of 113° $\leq \omega \leq 157$°, nest pursuing is effected toward six slit regions with the exception of the right-upper and left-lower slit regions, as shown in FIG. 7(d). Alternatively, next pursuing is effected toward either of three slit regions represented by arrow marks of solid lines and three slit regions represented by arrow marks of dotted lines.

Figure 8:
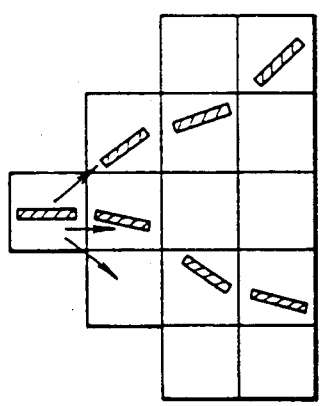
FIG. 8 is a view illustrating by way of example an occurrence of branching.

Next, the computor 4 makes a determination using the determination process as shown in FIG. 4 as to whether or not crack is practically existent within the adjacent slit regions located in the directions of pursuing determined in that way and then it extracts line segments using the aforementioned processing of projection only in the slit regions for which a determination has been made such that crack is existent (step 210). Incidentally, in a case where a determination is made by a single pursuing operation such that crack is existent in two or more slit regions, as shown in FIG. 8, this is determined as "branching" and line segments are extracted in the respective slit regions where cracks are existent (step 230). In a case where crack is detected only in a single slit region in the directions of pursuing, a determination is made such that no branching occurs and line segments are extracted only in the single slit region where crack is existent (step 210).

The computor 4 executes a processing of pursuing to be effected from the NO. 1 start point serving as an initial point as well as a processing of extracting line segments by repeatedly executing the processing of pursuing until the pursuing region extends to an end region in one frame or until no crack is recognized in the directions of pursuing. When the processing of pursuing is terminated (step 220), the computor 4 has informations on extracted line segments (ω, W, L, coordinates representative of segment, coordinates representative of ridge line and others) and informations on slit connectedness (informations representing whether or not line segments are connected between adjacent slits: in this case when crack is existent in the adjacent slits, a determination is made such that connection is made therebetween) stored in the memory (step 240). Thereafter, the computor 4 executes a processing of pursuing and a processing of extracting line segments with respect to a next NO. 2 start point in the same manner as mentioned above (step 250). When the processings of pursuing and extracting are terminated with respect to all start points (step 260), the computor 4 calculates evaluation data such as an occurrence rate of crack on the road surface corresponding to the relevant frame (represented by 512×512), a length of the same and so forth using informations on line segments and informations on slit connectedness (step 270). After completion of the data processing on the relevant frame in this manner, the computor 4 transfers from the magnetic tape 3 data on the road surface corresponding to a next frame again (step 280). Thereafter, it executes data processing within the next frame in the same manner as mentioned above.

Figure 9:
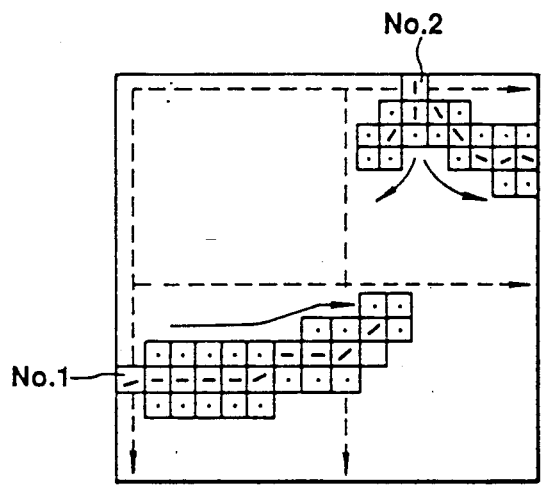
FIG. 9 is a view illustrating results derived from extraction of line segments within a single frame.

FIG. 9 illustrates by way of example a processing of pursuing and a processing of extracting line segments. In this case, the processing of pursuing and the process of extracting are executed from two start points, i.e., NO. 1 start point and NO. 2 start point.

According to the aforementioned embodiment, a processing of extracting line segments is not executed in all slit regions but informations on line segments corresponding to an image representative of crack are obtained by executing a series of processings comprising searching for a start point, determination on the direction of pursuing, determination as to whether crack is existent or not, extracting of line segments, determination on the direction of pursuing, determination as to whether crack is existent or not, and extracting of line segments. Consequently, the number of processings of extracting line segments can be reduced substantially and a speed required for data processing can be increased substantially.

Figure 10:
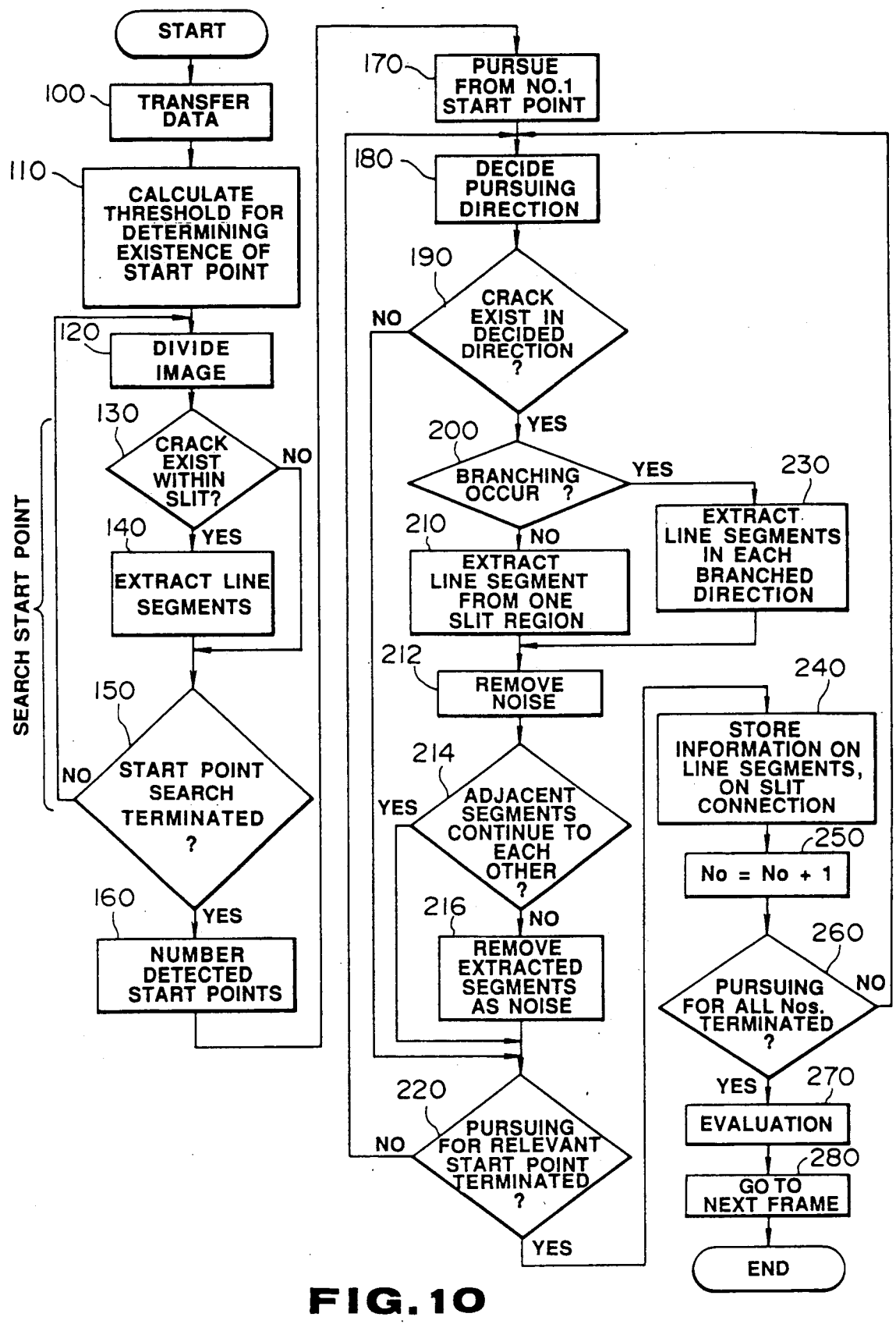
FIG. 10 is a flowchart illustrating other embodiment of the present invention.

FIG. 10 illustrates other embodiment of the present invention. A flowchart shown in FIG. 10 is such that a step 212, a step 214 and a step 216 are additionally inserted between the step 210 and the step 220 in the aforementioned flowchart shown in FIG. 1. Accordingly, this embodiment is different from the preceding embodiment only in this regard.

Specifically, according to the order of processings shown in FIG. 10, a slit region for pursuing is determined in a manner shown in FIG. 7 (step 180), a determination is made such that crack is existent in the determined slit region (step 190), a processing of extracting line segments is performed on the basis of results derived from the determination (steps 210 and 230) and thereafter a processing of removing noise and a processing of making a determination on connectedness as mentioned below are executed in the same manner as in the preceding embodiment.

Figure 11:
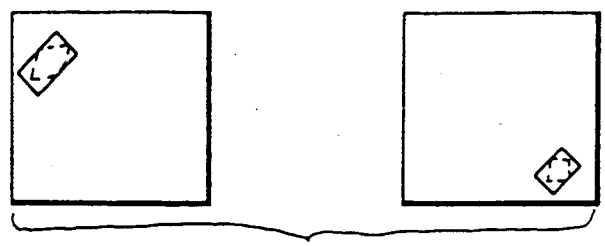
FIG. 11 is a view illustrating by way of example results derived from extraction of line segments representative of noise.

First, noise is removed on the basis of line length L, line width W and line direction ω representative of informations on the extracted line segments (step 212). Among the line segments extracted at the steps 210 and 230, a line segment corresponding to the crack has a line length L which is long to some extent, has a line width W which is not excessively wide and has a relative angle relative to the adjacent segment which is linear to some extent. In contrast with this, as shown in FIG. 11, a line segment corresponding to noise has a length L which is short, has a width W which is wide and has a relative angle relative to the adjacent segment which has no directionality. Thus, noise can be removed by setting adequate thresholds for values of determination parameters L, W and ω and then taking off parameters which fail to satisfy conditions established by the thresholds.

Next, the computor 4 makes a determination on connectedness of the line segments which remain after the processing of removing noise. This is because of the fact that the line segments which remain after the processing of removing noise do not necessarily provide data representative of crack but may provide a noise component. In view of this fact, the noise component which can not be removed during the processing of removing noise is removed utilizing a property that data representative of crack are connected between adjacent slits.

Figure 12:
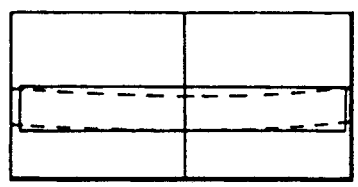
FIGS. 12 and 13 are a view illustrating results derived from various line segments, respectively.
Figure 13:
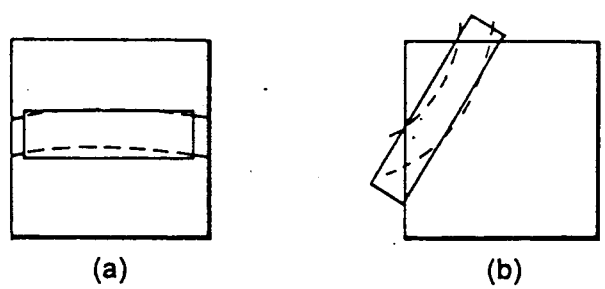
Figure 14:
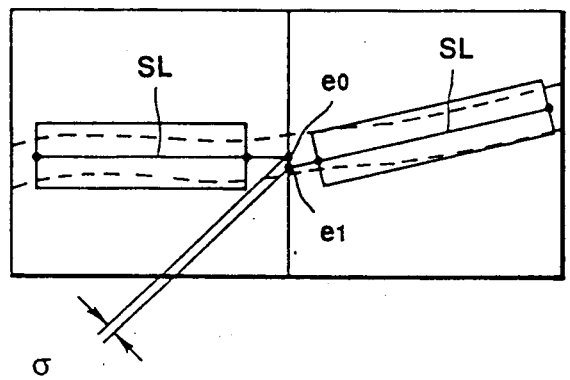
FIG. 14 is an illustrative view for explaining a method of making a determination on continuation.

Determination on connectedness is made in the following manner. Namely, in a case where adjacent segments are connected to each other as shown in FIG. 12, connectedness can simply be determined but some results derived from extraction of line segments reveal that the crack does not reach the surrounding lines of a slit, as shown in FIG. 13(a) in spite of the fact that it practically extends across the slit or it extends beyond the surrounding lines of a slit, as show in FIG. 13(b). It should be noted that the reason why a line segment extends beyond the surrounding lines of a slit is attributable to the fact that a projected wave shape is obtained by turning the slit or a corresponding image or a processing of extracting a line segment is performed again using a slit having a double size (represented by 64×64) in a case where a projected wave length has a peak value P (see FIG. 6(c)).

In such case, intersections $e_0$ and $e_1$ made by ridge lines SL and a boundary between both slits are obtained by prolonging or contracting the ridge lines SL for the extracted line segments and a distance σ between the intersections $e_0$ and $e_1$ is then obtained. When it is found that the distance σ remains within a predetermined value $\sigma_c$, a determination is made such that the line segments continue one after another and when it is found that σ is more than $\sigma_c$, a determination is made such that they discontinue (step 214).

In a case where an existence of connectedness is determined by the above determination, a determination is made such that the line segments provide data representative of crack, and thereafter a processing of pursuing is executed on the basis of a line direction ω set by the line segments. But, in a case where discontinuation is recognized by the foregoing determination, the line segments are removed as noise (step 216). Thereafter, no pursuing is effected any more with the line segments used as a start point for a pursuing operation. Later processings are same to those in the preceding embodiment. Accordingly, repeated description will not be required.

According to this embodiment, a noise component is removed from extracted line segments and a processing of pursuing is executed only on the basis of line segments corresponding to data representative of crack. Thus, execution of an useless processing of extracting line segments can be prevented, a crack recognizing rate can be improved and an occurrence of incorrect recognition can be reduced.

Figure 15:
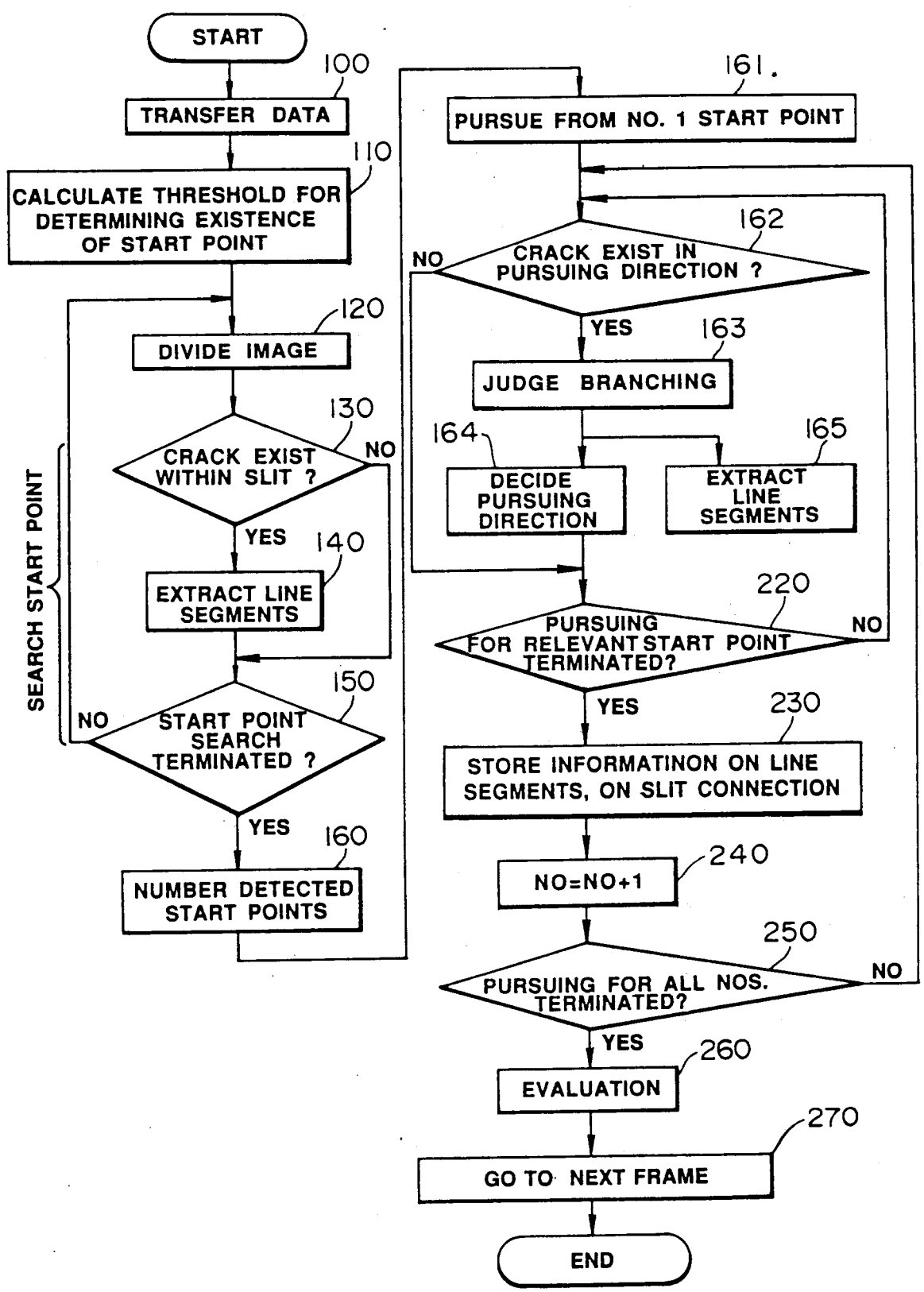
FIG. 15 is a flowchart illustrating another embodiment of the present invention.

FIG. 15 illustrates another embodiment of the present invention.

Figure 1:
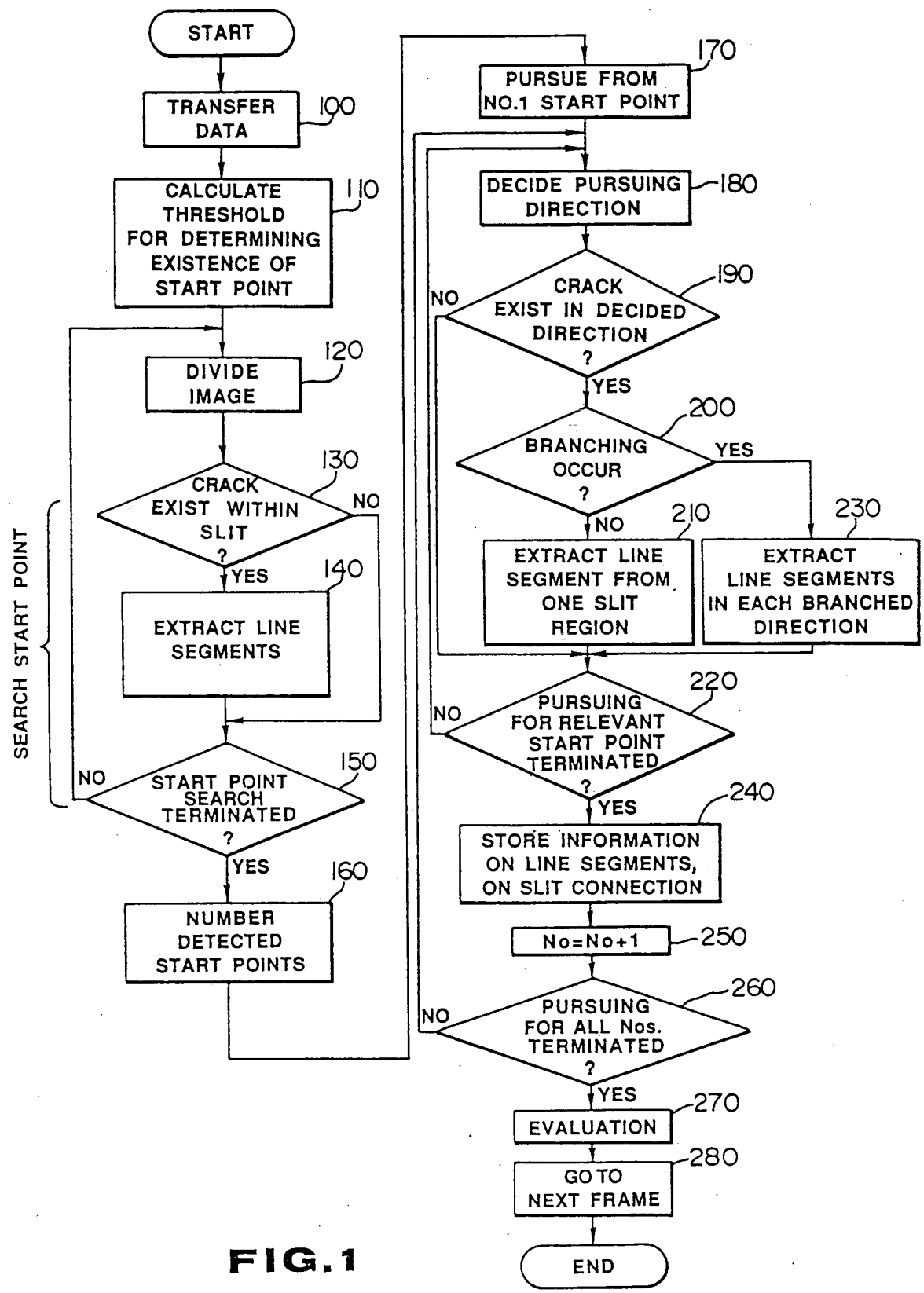
FIG. 1 is a flowchart illustrating an embodiment of the present invention.

The embodiment shown in FIG. 15 is such that steps 161 to 165 are substituted for the steps 170 to 210 and the step 230 in the embodiment shown in FIG. 1 but other steps rather than the aforementioned one are entirely same to the latter. Namely, a method of determining the direction of pursuing and a timing of extracting line segments in this embodiment are substantially different from the embodiment shown in FIG. 1.

Figure 16:
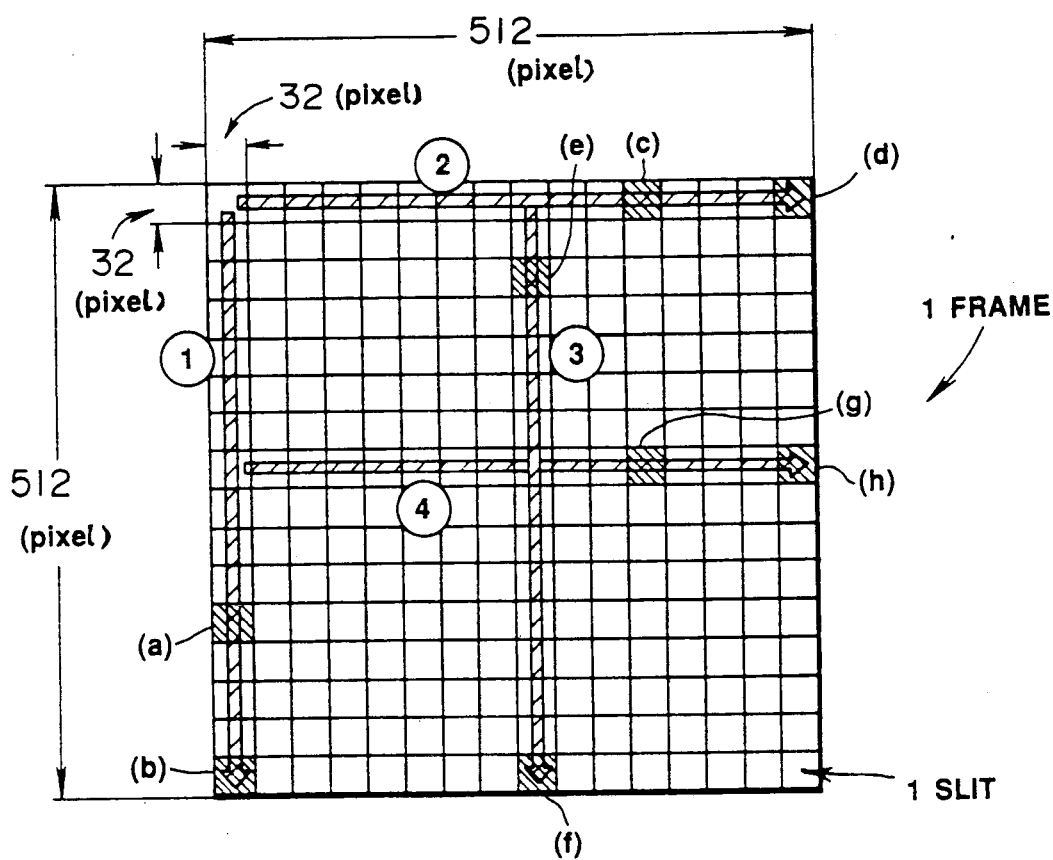
FIG. 16 is an illustrative view for explaining by way of example a processing of searching for a start point in accordance with the embodiment shown in FIG. 15, FIGS. 17a-17h are illustrative views for explaining a processing of making a determination on the direction of pursuing in the start point region in accordance with the embodiment shown in FIG. 15, FIGS. 18a-18h are illustrative views for explaining a processing of making a determination on the direction of pursuing in a normal region.

Referring to FIG. 15, the computor 4 is operated to select a start point for a pursuing operation in the relevant frame by repeatedly executing a processing of making a determination as to whether a start point is existent or not and a processing of extracting line segments in accordance with the order of the arrow marks (1), (2), (3) and (4) in FIG. 16 in the same manner as in the aforementioned embodiment, extract line segments from the selected start point for a pursuing operation and thereafter allot a serial number to a slit region selected by a processing of searching for a start point to execute the following "processing of pursuing" in accordance with the order of allotted numbers (steps 100 to 160).

First, with respect to the NO. 1 start point, a direction of pursuing to be next effected is determined on the basis of the position assumed by this start point (step 161). In the embodiment shown in FIG. 1, the direction of pursuing to be next effected is determined in correspondence to a line direction 0 of extracted line segments but in this embodiment the direction of pursuing is determined in correspondence to the position assumed by the start point. For example, in a case where the start point for a pursuing operation is located at a position identified by (a) in FIG. 16, a determination is made such that three adjacent slit regions on the right-hand side are recognized as regions to be next pursued, as shown in FIG. 17(a). Then, when a starting point is located at a position identified by (b), (c), (d), (e), (f), (g) or (h) in FIG. 16, a direction of pursuing to be next effected is determined as shown in FIGS. (b), (c), (d), (e), (f), (g) and (h). According to this embodiment, when a pursuing operation is performed from the start point, the direction of pursuing operation is specified only in dependence on the position where the start point is situated within the relevant frame.

Next, the computor 4 makes a determination as to whether or not crack is practically existent within the pursuing slit region determined in that way, using the determination process having a histogram in FIG. 4 employed therefor in the same manner as in the aforementioned embodiment (step 162).

When crack is detected by the above determination, the computor 4 activates the line segment extracting processor 7 to extract line segments using the aforementioned processing of projecting within the slit region for which a determination has been made such that crack is existent step 165).

At this time, the computor 4 performs a processing of determining the direction of pursuing to ne next effected in parallel with the processing of extracting line segments (step 164). In this case, it should be noted that the direction of pursuing is determined on the basis of a positional relationship between the preceding slit for which a determination is made such that crack is existent and the slit determined two times before. Specifically, in a case where pursuing has been effected in the transverse direction (in a case where two slits for which a determination has been made such that crack is existent are located adjacent to each other in the transverse direction), as shown in FIGS. 18(a) and (b), a next pursuing operation is performed for three right or left slits. In a case where pursuing has been effected in the vertical direction (in a case where two slits are located adjacent to each other in the vertical direction), as shown in FIGS. 18(c) and (d), a next pursuing operation is performed for three lower or upper slits. Further, in a case where pursuing has been effected in the oblique direction (in a case where two slits are located adjacent to each other in the oblique direction), as shown in FIGS. 18(e) to (h), a next pursuing operation is performed for the shown three slits located obliquely of the middle slit.

According to a method of deciding the direction of pursuing on the basis of the line direction ω of informations on line segments as is case with the embodiment shown in FIG. 1, the direction of pursuing to be next effected can not be decided, unless results derived from extraction of the line segments are obtained. Accordingly, in this case, a processing of determining the direction of pursuing and a processing of extracting line segments are performed one after another without fail.

However, with the method in accordance with this embodiment, the direction of pursuing is decided in dependence on a positional relationship between the slit at this time for which a determination is made such that crack is existent and the slit determined at the preceding time. Thus, the direction of pursuing can be decided at the time when the position assumed by the slit including crack is determined. Accordingly, there is no need of performing the processing of deciding the direction of pursuing after the processing of extracting line segments, and the processing of determining the direction of pursuing and the processing of extracting line segments can be executed after determination as to whether crack is existent or not. This makes it possible to perform data processing at a higher speed at an improved efficiency.

Figure 19:
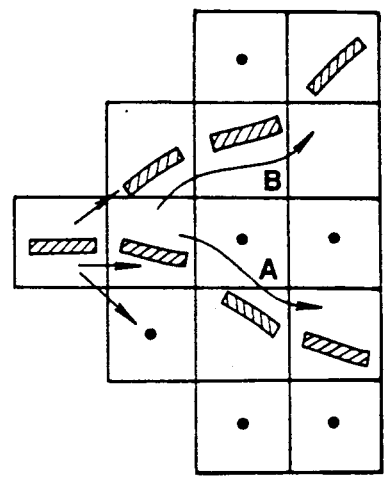
FIG. 19 is a view illustrating by way of example an occurrence of branching.

Incidentally, in a case where a determination is made during a first pursuing operation such that crack is existent in two or more slit regions, as shown in FIG. 19, an occurrence of "branching" is determined (step 163). In this case, pursuing is first effected in the direction A in the same manner as mentioned above and after completion of this pursuing operation, a next pursuing operation is performed in the direction B.

Figure 20:
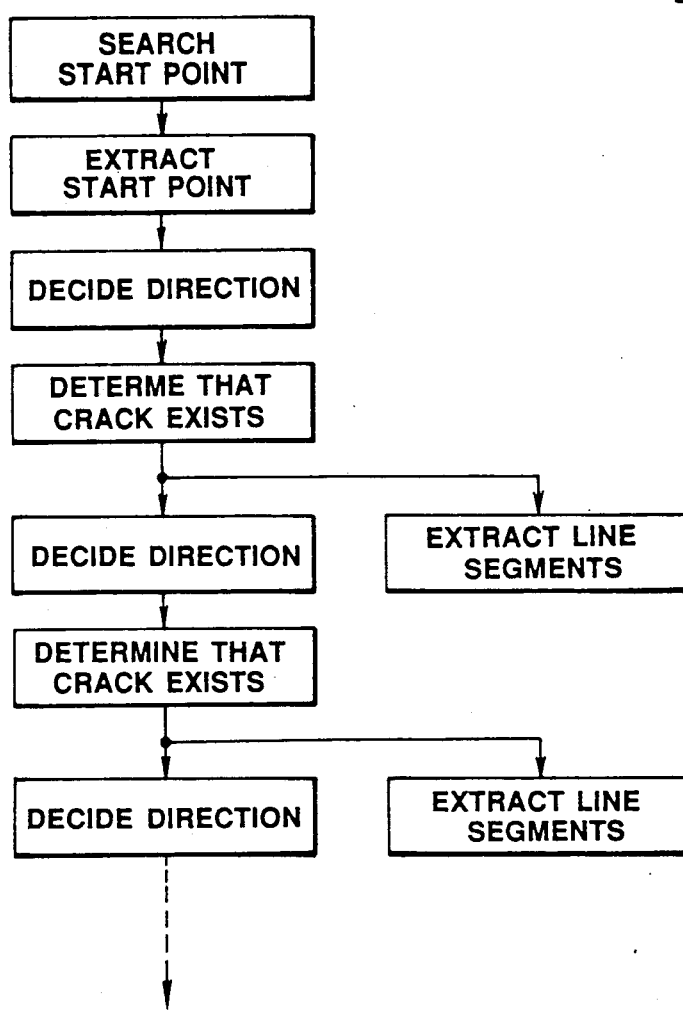
FIG. 20 is a view schematically illustrating by way of flowchart a series of processings in accordance with the embodiment shown in FIG. 15.

Then, the computer 4 executes a processing of pursuing from the NO. 1 start point serving as an initial point as well as a processing of extracting line segments by repeatedly executing such a processing of pursuing in the same manner as in the aforementioned embodiments until the pursuing region reaches an end region within a single frame or until no crack is recognized in the direction of pursuing. FIG. 20 schematically illustrates by way of flowchart such a series of processings of pursuing. When such pursuing is completed (step 220), the computer 4 executes the same processings as in the aforementioned embodiments. Namely, the computor 4 has informations on an extracted line segment (ω, W, L, coordinates indicative of segments, coordinate indicative of a ridge line and so forth) and informations on slit connectedness (informations representing whether the line segment is connected between adjacent slits or not) stored in the memory (step 230) and thereafter it executes the same processings of pursuing and extracting line segments with respect to the NO. 2 start point in the same manner as mentioned above (step 240). When the processings of pursuing and extracting with respect to all start points are terminated (step 250), the computor 4 calculates evaluation data such as an occurrence rate of crack on the road surface corresponding to the relevant frame (represented by 512×512), a length of respective crack or the like using informations on line segments, informations on slit connectedness or the like informations (step 260). After the data processing for the relevant frame is terminated, the computer 4 transfers data on the road surface corresponding to a next frame from the magnetic tape 3 again (step 270). Thereafter, it performs data processing within the next frame in the same manner as mentioned above.

According to this embodiment, the direction of pursuing is decided in dependence on a positional relationship between two slits to be pursued and a processing of deciding the direction of pursuing and a processing of extracting line segments are performed in parallel with each other, as shown in FIG. 20. Consequently, processings can be achieved at a high efficiency and a time required for data processing can be shortened.

INDUSTRIAL APPLICABILITY

The present invention is advantageously applicable to a series of computor processings for recognizing crack in image data derived from measurements for the road surface.

What is claimed is:

1. A method of processing image data indicative of cracks wherein data of a picture-taken road surface is stored in an image memory and a group of line segments corresponding to the cracks are then extracted from the data of the road surface stored in the image memory, the method comprising:

a first step of dividing the image memory into a plurality of frame regions and further dividing each of the frame regions into a plurality of slit regions;

a second step of previously selecting some slit regions from the plurality of slit regions in one frame regions, determining whether or not image data indicative of a crack exist in each of the selected slit regions on the basis of a fact that, among pixels within each of the selected slit regions, whether or not the number of pixels having a density near to black tone more than a predetermined density exceeds a predetermined number, and selecting as a pursuing start point region the slit region being determined that the crack exists therein among the selected slit regions;

a third step of extracting from the pursuing start point region a line segment having a rectangular contour corresponding to a crack and having parameters of position coordinates in the slit region, a line width, a line length, and a line direction;

a fourth step of previously setting some slit regions to be pursued from among a plurality of slit regions adjacent to the selected slit region in correspondence with the line direction as one of the parameters of the line segment corresponding to the crack, and determining a slit region to be next pursued among the plurality of slit regions adjacent to the pursuing start point region on the basis of the content previously set corresponding to the line direction of the line segment of the selected pursuing start point region;

a fifth step of determining whether or not crack data exists in the determined slit region to be next pursued on the basis of a fact that, among pixels within each slit region, whether or not the number of pixels having a density near to black tone more than a predetermined density exceeds a predetermined number and extracting, only in the region which has been determined that the crack exists therein, a line segment having a rectangular contour corresponding to the crack and having as parameters a line width, a line length, a line direction, and position coordinates in the determined slit region;

a sixth step of determining a slit region to be next pursued which is adjacent to the selected slit region on the basis of the set content corresponding to the line direction of the extracted line segment, determining whether or not a crack exists in the determined slit region on the basis of a fact that, among pixels within each slit region, whether or not the number of pixels having a density near to black tone more than a predetermined density exceeds the predetermined number, and repeatedly executing the processing of extracting a line segment having a rectangular contour corresponding to a crack and having as parameters a line width, a line length, a line direction, and position coordinates in the slit region only in the region which has been determined that the crack exists therein until pursuing is terminated, wherein the extracting of line segments in the frame region is executed by performing the fourth to sixth steps for each pursuing start point selected in the second step.

2. The method of claim 1, wherein the predetermined density represents a value corresponds to an average value of densities exhibited by data of the road surface in the frame region.

3. The method of claim 1, wherein the set content of the fourth and sixth steps is such that when the line direction of the line segment extends in the approximately horizontal direction, six adjacent divided regions excluding adjacent divided regions situated just above and beneath the middle region are regions to be next pursued, when the line segment extends in the approximately vertical direction, six adjacent divided regions excluding adjacent divided regions situated leftwardly and rightwardly of the middle region are regions to be next pursued, when the line segment extends in the approximately oblique direction from left-upper down to right-lower side, six adjacent divided regions excluding right-upper and left-lower adjacent divided regions are regions to be next pursued, and when the line segment extends in the approximately oblique direction from left-lower up to right-upper side, six adjacent divided regions excluding left-upper and right-lower adjacent divided regions are regions to be next pursued.

4. The method of claim 1, wherein during the extracting processing of the line segment in the third, fifth and sixth steps, the line width, the line length and a relative angle of the extracted line segment relative to a line segment extending from the pursuing start point are used as determination parameters for removing noise, a determination is made as to whether or not the extracted line segment is a segment corresponding to the noise on the basis of a comparison result of the determined parameters and each of set values corresponding to the determined parameters to remove the segment being determined to be the noise and a determination is made as to whether a continuity of the line segments remained from the processing of removing the noise with respect to the line segment extending from the pursuing start point exists to validate the only segments being determined as being continuous.

5. The method of claim 4, wherein during the third, fifth and sixth steps, a distance between an intersection of a center line extending from the pursuing end point of a line segment with a boundary between a divided region situated in the pursuing end point and a divided region situated in the pursuing start point and an intersection of a center line extending from the pursuing start point of a line segment with the boundary is obtained and when it is found that the distance is less than a preset value, a determination is made such that the continuation exists.

6. A method of processing image data indicative of cracks wherein data of a picture-taken road surface is stored in an image memory and a group of line segments corresponding to the cracks are then extracted from the data of the road surface stored in the image memory, the method comprising:

a first step of dividing the image memory into a plurality of frame regions and further dividing each of the frame regions into a plurality of slit regions;

a second step of previously selecting some slit regions from among the plurality of slit regions in one frame region, determining whether or not image data indicative of a crack exist in each of the selected slit regions on the basis of a fact that, among pixels within each of the selected slit regions, whether or not the number of pixels having a density near to black tone more than a predetermined density exceeds a predetermined number, and selecting as a pursuing start point region the slit region being determined that the crack exists therein among the selected slit regions;

a third step of extracting from the pursuing start point region a line segment having a rectangular contour corresponding to a crack and having parameters of position coordinates in the slit region, a line width, a line length, and a line direction;

a fourth step of determining a slit region to be next pursued from a plurality of slit regions adjacent to the pursuing start point region on the basis of a position of the pursuing start point region in the frame region;

a fifth step of determining whether or not crack data exists in the determined slit region to be pursued on the basis of a fact that, among pixels within each slit region, whether or not the number of pixels having a density near to black tone more than a predetermined density exceeds the predetermined number;

a sixth step of extracting, in the region which has been determined that the crack exists therein, a line segment having a rectangular contour corresponding to a crack and having as parameters a line width, a line length, a line direction, and position coordinates in the slit region;

a seventh step of determining a slit region to be next pursued from a plurality of slit regions adjacent o the slit region on the basis of a positional relationship between the start point region and the slit region which has been determined in the sixth step that the crack exists, in parallel with the processing of extracting line segments during the sixth step;

an eighth step of determining whether or not crack data exists in the adjacent slit region to be pursued on the basis of a fact that, among pixels within each slit region, whether or not the number of pixels having a density near to black tone more than a predetermined density exceeds the predetermined number;

a ninth step of extracting, in the region which has been determined that the crack exists therein, a line segment having a rectangular contour corresponding to the crack and having as parameters a line width, a line length, a line direction, and position coordinates in the slit region;

a tenth step of determining a slit region to be next pursued from a plurality of slit regions adjacent to the slit region on the basis of a positional relationship between the slit region which has been determined in the preceding determination that the crack exists and the slit region which has been determined at this time that the crack exists, wherein the eight to tenth steps are repeatedly executed until the pursuing with respect to the pursuing start point in the frame region is terminated and the extracting of line segments in the frame region is executed by performing the fourth to tenth steps for each of the pursuing start point selected in the second step.

7. The method of claim 6, wherein during the fourth, seventh and tenth steps, when the positional relationship between the slit region which has been determined in the preceding determination that the crack exists therein and the slit region which has been determined at this time that the crack exists therein is such that the both regions are adjacent to each other on the right and left sides, three slit regions on the right or left side corresponding to the pursuing direction are determined as regions to be next pursued, when the positional relationship between the both regions is such that the both regions are adjacent to each other on the upper and lower sides, three regions on the upper or lower side corresponding to the pursuing direction are determined to be next pursued, and when the positional relationship between the both regions is such that the both regions are adjacent to each other in the oblique direction three slit regions corresponding to the oblique pursuing direction are determined to be next pursued.

* * * * *